UNITED STATES PATENT OFFICE.

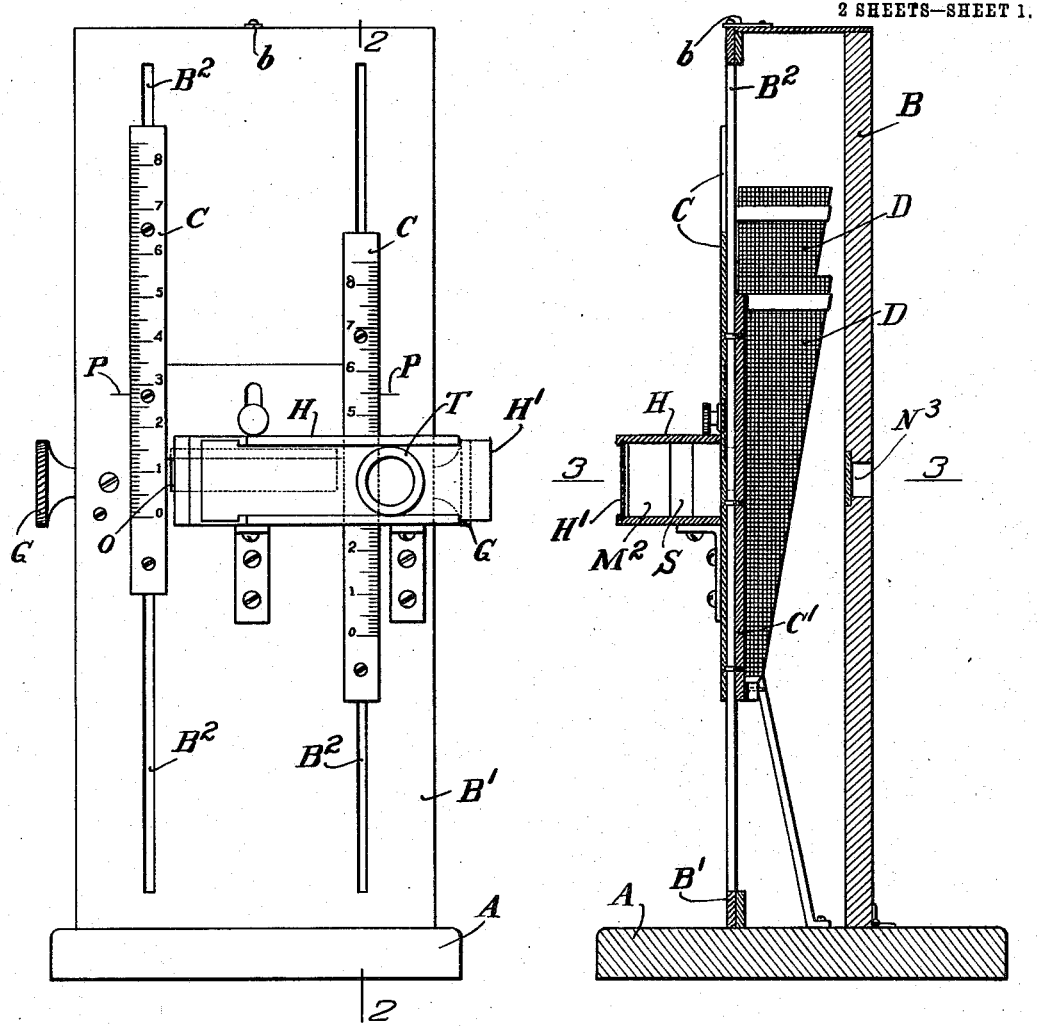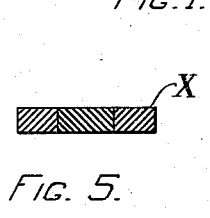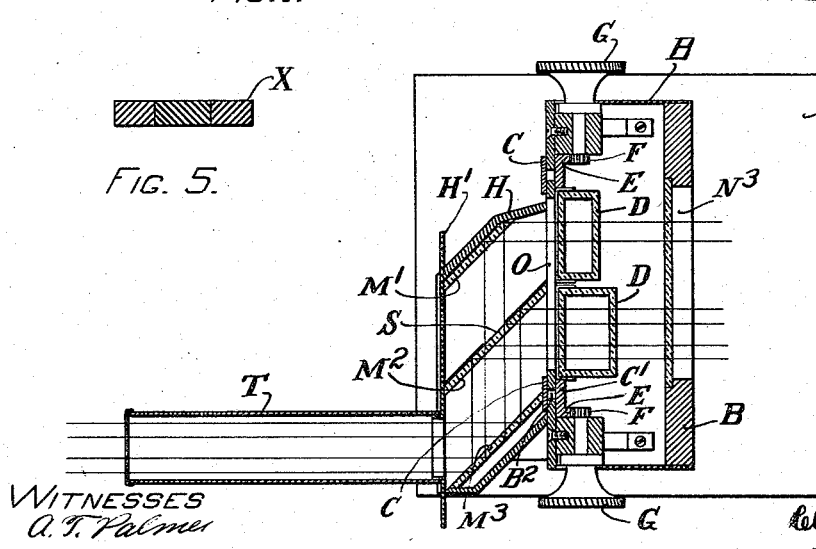

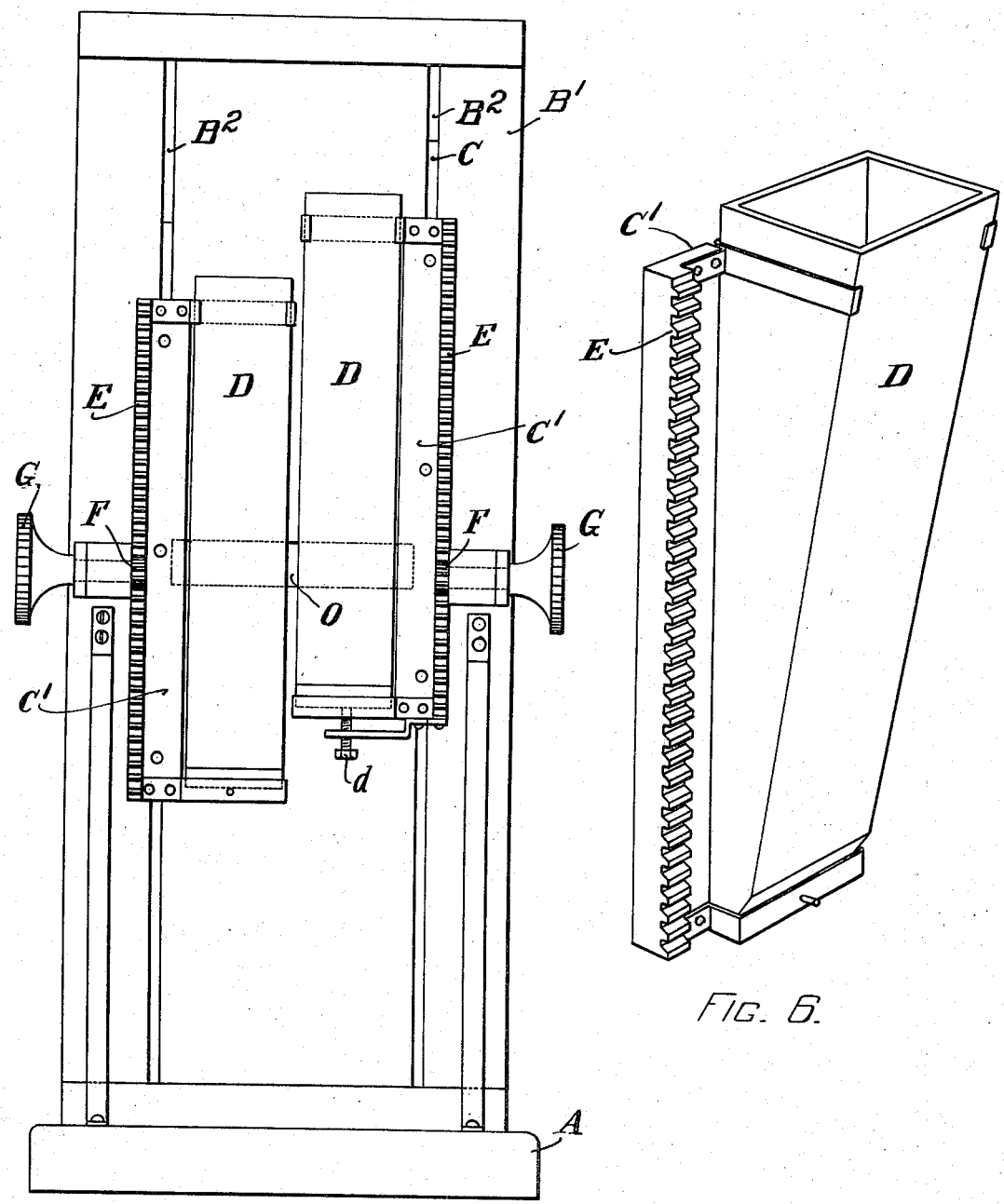

CHARLES HENRY WHITE, OF CAMBRIDGE, MASSACHUSETTS.

COLORIMETER.

No. 840,538.     Specification of Letters Patent.     Patented Jan. 8, 1907.

Application filed June 4, 1906. Serial No. 320,194.

*To all whom it may concern:*

Be it known that I, CHARLES HENRY WHITE, a citizen of the United States, residing at Cambridge, in the county of Middlesex and Commonwealth of Massachusetts, have invented certain new and useful Improvements in Colorimeters, of which the following is a specification.

This invention relates to a device for determining the amount of a substance in a material by a color comparison. In making comparisons of this sort it is necessary to have a color standard with which the material to be investigated can be compared, and this is usually done by preparing a standard solution of a known percentage and bringing the material to be tested to the same color by diluting one or the other or by similar steps. In order to make a comparison in this manner, great delicacy of manipulation is necessary, and such tests are necessarily long and tedious and involve considerable preparation, inasmuch as it is desirable to have the standard solution approximate that to be tested at the outset. To facilitate a test of this sort, I have devised certain means for comparing solutions, whereby a solution of known standard may be presented to indicate a scale of standards and whereby a solution may be compared with such standard by a simple movement of the parts of the device, and whereby the colors will be presented to the eye in a convenient manner for comparison.

The determination of the percentage of carbon in steel is advantageously made by a color comparison, and the colorimeter herein described is particularly more adapted for this test. In the specification which follows I have therefore described my colorimeter with particular reference to the testing of the amount of carbon in steel.

In the specification and the drawings which form a part thereof like letters of reference indicate corresponding parts throughout.

In the drawings, Figure 1 is a front view of my colorimeter; Fig. 2, a vertical cross-section on the line 2 2 of Fig. 1; Fig. 3, a plan section on the line 3 3 of Fig. 2; Fig. 4, a rear elevation with the casing removed; Fig. 5, a diagram of the color-image, and Fig. 6 a detail of one of the wedges.

A is any suitable base on which is mounted a frame B', upon which the mechanism of the device is located.

B is a box which forms a casing for the mechanism and which is hinged to the base of the frame B' and held in place by a catch $b$. The box B has an opening $N^3$, through which the light enters. O is a corresponding opening in the frame B' of adjustable width, and $B^2$ represents vertical slots in the frame B', suitably spaced on each side of the opening O.

C' represents a pair of independent frames slidably mounted upon B' and operated by racks E, which are engaged by pinions F, held on the frame B' and rotated by the milled wheels G. The frames C' and the racks E are connected through the slots $B^2$ with the scales C, which are suitably marked to read from the pointers P, marked on the face of B'.

D represents hollow wedges which may advantageously be made by cementing together suitably-shaped pieces of glass with Canada balsam, or they may be held in any sort of a frame or otherwise fastened together. The wedges are blackened on their sides to exclude light. One wedge is slidably mounted on its frame C' and adjusted by means of the screw $d$. The angle of these wedges is preferably small, and I therefore make the wedge in the truncated form shown in Fig. 6 to prevent undue length. Since a longitudinal vertical section of one of these wedges is triangular and equal in all respects to a similar section of the other wedge, it is not necessary to measure the thickness of the solution to determine the ratio, as the lengths of each wedge from its end to the point to be compared will give the same result. The scales C may therefore be any similarly-divided linear scales reading the length of the wedges D.

H is an assembling-reflector mounted over the opening O and covered by a slide H', which carries an eye-tube T, through which the operator makes his observation. The assembling-reflector H contains two reflecting-mirrors M' and $M^2$, placed at an angle with the opening O and similarly faced.

$M^3$ is an oppositely-faced mirror set at an angle to reflect from the mirrors M' and $M^2$ in the eye-tube T.

S is a section on the mirror $M^2$ from which the back has been removed, so as to allow part of the light from the mirror M' to pass through the mirror $M^2$ and fall upon the mirror $M^3$.

Referring to the diagram in Fig. 3, it will be seen that the light passing through one wedge will fall upon the mirror M', will pass through the openings of the mirror M², and be reflected as a narrow band from the mirror M³. The light from the other wedge will fall upon the mirror M² and will be reflected over its entire surface with the exception of that part of the light which falls upon the surface S, from which the backing has been removed. The mirror M³ will therefore reflect the light from the mirror M² in two blocks, and the transmitted light from the two wedges will therefore be presented to the eye of the observer with the light of one wedge arranged on two sides of a band of light from the other wedge and will appear as the image X. (Shown in Fig. 5.) This gives the observer an opportunity to observe the transmitted light from the two wedges and to compare the colors of the same most advantageously. The slide H' can be moved across the box H and the eye-tube T removed, if it is desired to pack an instrument in a small case.

In making a test the device is used as follows: A standard solution is prepared by dissolving steel of a known percentage of carbon in nitric acid, and the solution is placed in one of the wedges—say the right-hand wedge—of the device. The thickness of the solution will therefore vary with the thickness of the wedge, and by adjusting the wedge to vary the thickness the standard may be presented in any strength desired. If, now, an equal portion of steel be dissolved in an equal portion of acid and placed in the other wedge, and the wedge moved until the color of the transmitted light is the same as that transmitted through the standard solution in the right-hand wedge, the scale will show in units the relative amount of carbon in the wedge. The percentage of carbon varies inversely in proportion to the thickness of the wedge, and inasmuch as the standard solution is known the reading of the scale of the wedge containing the solution to be tested will show by inverse proportion the percentage of carbon in the solution in the left-hand wedge. By setting the left-hand wedge containing the solution to be tested at the unit reading of the scale corresponding to the known percentage of the standard solution and by moving the right-hand wedge containing the standard solution until the colors match, the reading of the scale of the standard wedge will give directly the reading in units corresponding to the per cent. of the solution to be tested. For example, suppose a 0.30-per-cent. standard is used. The left-hand wedge containing the solution to be tested is set at "30." Suppose, now, after moving the right-hand wedge containing the known solution until the colors match the scale on the right-hand wedge reads "36." It will then be known at once and without computation that the percentage of the unknown solution in the left-hand wedge is 0.36 per cent.

Various modifications in the liquid-holding means, adjusting mechanism, and means for comparing the colors may obviously be made without departing from the spirit of my invention.

What I therefore claim, and desire to secure by Letters Patent, is—

1. In a device of the class described the combination of means for transmitting light, a plurality of light-transmitting tanks for maintaining in bodies of liquid the same gradually-increasing thickness, and means to move said tanks independently across the path of the transmitted light.

2. In a device of the class described the combination of means for transmitting light, a plurality of light-transmitting tanks for maintaining in bodies of liquid the same gradually-increasing thickness, means to move said tanks independently across the path of the transmitted light and means to compare the interposed thicknesses of the liquids in the tanks.

3. In a device of the class described the combination of means for transmitting light, a plurality of light-transmitting tanks for maintaining in bodies of liquid the same gradually-increasing thickness, means to move said tanks independently across the path of the transmitted light, means for observing the transmitted lights in adjacent bands and means to compare the interposed thicknesses of the liquids in the tanks.

In testimony whereof I affix my signature in presence of two witnesses.

CHARLES HENRY WHITE.

Witnesses:
WM. B. POOR,
ELLIS SPEAR, Jr.